United States Patent Office 2,912,059
Patented Nov. 10, 1959

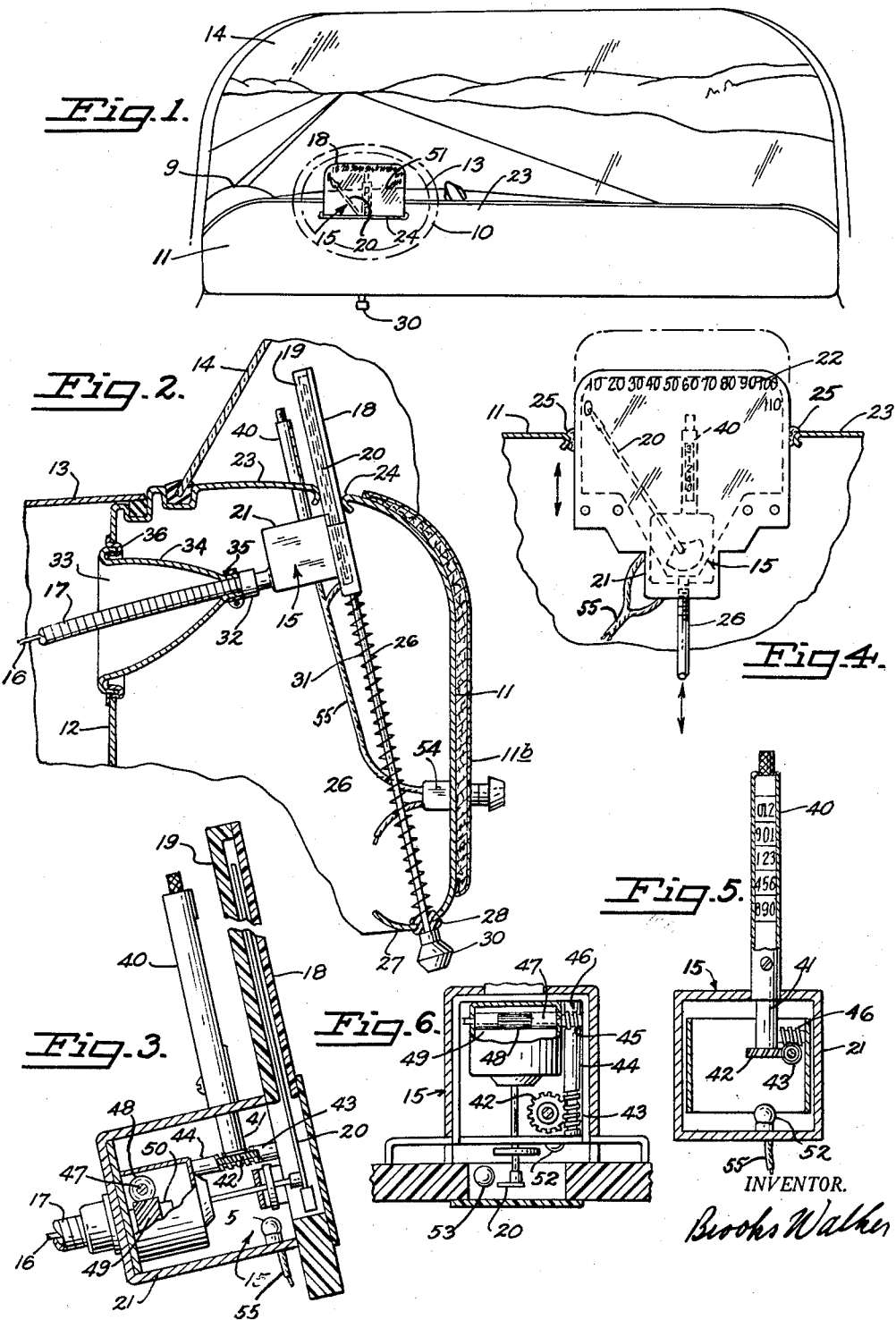

2,912,059

SPEEDOMETER IN LINE OF SIGHT

Brooks Walker, Piedmont, Calif.

Application August 5, 1957, Serial No. 676,700

11 Claims. (Cl. 180—90)

This invention pertains to instruments as applied to vehicles and particularly to speedometers, air speed indicators, and instruments that the operator should watch or be conscious of while driving during daylight or at night. This application is a continuation-in-part of Serial No. 488,834, filed February 17, 1955, now abandoned.

Speedometers have been placed in line of sight of vehicle operators as is shown in my issued U.S. Patent No. 2,449,155. However, operators vary materially in size and in height of eyes above the vehicle seat, and seats are often adjustable for height and fore and aft positions, all of which vary the position of the operator's eye.

An object of this invention is to provide an adjustable instrument wherein the operator can vary the position of the instrument so that it intercepts the desirable position between the operator's eyes and the illuminated roadway or the desirable daylight position between the operator's eyes and the operator's view of the terrain ahead of the vehicle, or a lowered position during daylight.

Another object of the invention is to locate other instrument dials, such as that of the odometer, higher above the main body of the instrument than is the practice in conventional constructions, in order that such dial may be visible above the instrument panel, while the main body of the instrument and its operating shaft remain below the instrument panel. The main body of instruments and their cables are generally unsightly.

Another object of the invention is to provide a movable instrument, such as a speedometer, with a straight-in drive in line with the axis of needle rotation. This eliminates the necessity of an angle drive, which is expensive and may be noisy.

Another feature is a means of having the speedometer cable extend through an opening in the firewall back of the instrument panel while keeping this opening covered, to prevent engine noises and fumes from entering the driver's compartment.

Another object is to provide an odometer that is vertical relative to the sweep of the speedometer needle, rather than horizontal, so as to obscure less of a transparent instrument dial than a horizontal-type odometer would obscure.

Another feature of the vertical odometer is the simplicity of its drive, wherein the odometer drive shaft is mounted vertically, rather than having a vertical shaft at one side connected to an angle drive for a horizontal-type odometer.

Another feature is to provide an odometer drive in the raised position with the conventional number of shafts and gears.

Another feature is to provide a simplified instrument panel which is easier to manufacture, cheaper, good-looking and better adaptable to crash padding than a conventional instrument mounting.

Another and very important object is to provide a simple means of removing such instrument as the speedometer for servicing. In my invention, removal requires much less labor than in a conventional speedometer mounting. In this construction, after removing the cable connection and unscrewing the control handle, the complete speedometer and needle enclosure can be easily and cheaply removed for service and replacement.

Another object is the provision of a simplified control for the height of the speedometer or other instrument, incorporating a counterbalance.

Other objects and advantages of the invention will become apparent from the accompanying specification and claims.

I have illustrated my invention in the accompanying drawings, in which:

Fig. 1 is a view of an installation in an automobile, embodying the principles of my invention, and shown as it appears to the driver of the vehicle, with the instrument and its associated control in their raised position.

Fig. 2 is a side view in elevation and partly in section showing the construction of the unit, the location of the odometer and other instruments above the panel and how the free-moving speedometer drive is dust-proofed through the firewall.

Fig. 3 is an enlarged view of a portion of Fig. 2 cut away to show a portion of the speedometer and one form of gear train to the odometer, and also showing the sealed construction of the instrument.

Fig. 4 is a view in front elevation of the unit showing guides and control rod.

Fig. 5 is a view in front elevation of a modified form of odometer.

Fig. 6 is a top plan view of a conventional gear train showing vertical odometer takeoff.

In all figures like numerals of reference refer to corresponding parts in the various views.

I have shown for illustrative purposes, a portion of an automobile 9, having a steering wheel 10, an instrument panel 11, a firewall 12, a hood or engine cover 13, a windshield 14, and a speedometer, velocity meter or similar instrument 15. The speedometer 15 is driven by cable 16 sheathed in a housing 17 and leading from transmission takeoff, which may be of the usual type shown in 1953 Cadillac motor car service manuals.

The speedometer 15 has a transparent front needle cover 18 and a transparent rear needle cover 19 which form an enclosure over the needle 20 cooperating with the housing 21 of the speedometer 15. A series of numerals 22 adjacent the upper horizontal edge of either of the transparent speedometer needle covers 18 or 19 furnishes the correct speed indication relative to the motion of the needle 20. The needle 20 extends materially above the speedometer housing 21, so that considerable changes in the vertical location of the speedometer 20 are possible while still keeping the main body of the instrument below the top 23 of the instrument panel 11.

A slot 24 in the instrument panel 11 permits substantially vertical movement of the speedometer 20 for adjustment of its height while also giving friction that helps it stay in any position where it is set. Edge guide pads 25 may be provided at each end of the slot 24 to guide the vertical movement of the instrument 15. A rod 26 is threadably engaged in the housing 21. While rotation of the rod 26 carries some vertical movement of the speedometer 15, more vertical movement may be obtained by pulling the rod 26 down or pushing it up. The rod 26 extends down through an opening in the lower lip 27 of the instrument panel 11, a grommet 28 being provided to seal the opening and to give some friction that helps to hold the rod 26 in place in any position where it is put. The lower end of the rod 26 carries a handle 30 by which the rod 26 is rotated and also by which it is raised and lowered. A spring 31 mounted around the rod 26 is substantially counter-balances the weight of the speedometer 15 and its associated moving parts, so that adjustment is easy.

The cable 16 and its housing 17 are attached to the speedometer 15 by a nut 32 and extend out through an opening 33 in the firewall 12. A flexible boot 34 weatherproofed by a drawstring or clamp 35 and fastened to the opening 33 in the firewall 12 by a snap ring 36 allows the vertical motion necessary for the cable 16 and housing 17 to follow the speedometer 15 when the speedometer is moved up or down by the handle 30. This vertical motion is necessary to get the speedometer 15 in the desired position between the operator's eyes and the terrain ahead of the vehicle 10 relative to the vehicle hood 13, windshield 14, etc.

This invention provides an odometer 40, preferably of the vertical type, driven by a vertical shaft 41 from gears 42 and 43. The gear 43 is mounted on a shaft 44, which carries a gear 45 that is driven by a gear 46. The gear 46 is mounted on shaft 47 which is driven by a gear 48. In turn, the gear 48 is driven by a gear 49 which is mounted on a shaft 50 that is directly driven by the speedometer cable 16. The usual practice is to have the cable 16 rotate at 1000 r.p.m. when the vehicle is moving at 60 miles per hour, but variations from this ratio can be compensated by the gearing and speedometer needle drive to get correct speed and odometer indications. Obviously, the odometer 40 and all its component parts are moved vertically when the handle 30 is raised and lowered, and they move with and at the same rate as the speedometer housing 21.

Since this new location of the speedometer 15 and odometer 40 frees most of the instrument panel 11, the instrument panel 11 may be covered by a padding 11b to offer crash protection, a structure not normally possible because of the location of the customary instrument mountings. Illumination of the odometer may be by bulb 52 and the speedometer by bulb 53, which are controlled by switch 54 and wires 55. Switch 54 may be of the rheostat type to control the light intensity. While I have shown and described a speedometer 15-odometer 40 combination that is movable to accommodate the driver's desires, I wish it understood that other instruments such as tachometers, wind speed indicators, pressure or volume gauges, etc. may be so mounted to fall within the scope of this invention. In all such cases, the body of the instrument may be kept below an instrument panel 11 with a sufficient amount of the dial and indicator extending above to permit vertical movement for better adjustment to operator's eye level, etc.

At night, it may be desirable to move the indication of the instrument to where it intercepts the line 51 between the operator's eye and the illuminated terrain ahead of the operator, so that the indications are apparent without instrument illumination. The needle 20 and dial 22 will then appear as a silhouette against the illuminated terrain and will be very apparent to the operator without auxiliary lighting. This is especially valuable because instrument lighting is often disturbing to the operator at night, so that many operators often drive with no instrument lights at night and are therefore not informed as to their speed, etc.

This invention has been tested by thousands of miles of driving and these tests have proved that with the instruments in the line of sight of the operator it is not necessary to look at the instrument and change the focus of the operator's eyes from the roadway focus to the instrument focus and back to distance focus on the road in order to be conscious of both the instrument indications and the roadway conditions, especially where such indications appear as a silhouette against illuminated terrain. The operator is very conscious of a changing needle silhouette viewed out of the side of his cone of vision while his eyes are focused on the illuminated terrain ahead of the vehicle, so that there is no necessity of changing focus and looking directly at the speedometer or instrument.

It is a known fact that the time lag in changing focus and looking away from the roadway to read a conventional instrument and changing back to the longer focus for the roadway is greater with advancing age and appreciable at any age. Anything that can be done to keep the driver conscious of the vehicle speed (or other functions) without requiring his distraction from the road ahead or distraction from instrument lights will add materially to the safety of driving. These results are another object of this invention in addition to the other desirable new and useful results accomplished by the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. A vehicle having a speedometer combination adapted to be viewed at all times by the driver without distracting his attention from the roadway, comprising: a firewall separating two parts of the vehicle and having an opening therethrough; an instrument panel rearward of said firewall having an opening adjacent its top; a windshield forward of and higher than said panel; a speedometer cable extending through said firewall opening into a location between said firewall and said panel; a flexible booth in said firewall opening permitting movement of said cable up and down with respect to said firewall and sealing said firewall opening; a speedometer housing between said firewall and said instrument panel and having an indicating portion thereof only extending up through said panel opening, and a rigid rod mounted for sliding movement with respect to said panel and connected to said housing so as to space it relative to said panel, whereby when said rod is raised said housing is raised and when said rod is lowered, said housing is lowered relative to said panel and said windshield.

2. A vehicle having a speedometer-odometer combination adapted to be viewed at all times by the driver without distracting his attention from the roadway, comprising: a firewall separating two parts of the vehicle and having an opening therethrough; a padded, crash-protecting instrument panel rearward of said firewall having an opening adjacent its top; a windshield forward of and higher than said panel; a speedometer cable extending through said firewall opening into a location between said firewall and said panel; a flexible boot in said firewall opening permitting movement of said cable up and down with respect to said firewall and sealing said firewall opening; a speedometer housing between said firewall and said instrument panel and having a generally transparent portion thereof only extending up through said panel opening; speed-indicating means connected to said cable inside said housing and having a needle extending up into said transparent portion; a vertical odometer drive shaft supported for movement with said housing and operatively connected therein to said cable and having an indicating portion extending above said panel; a rod movable relative to said panel but frictionally retaining a position with respect thereto, and connected to said housing for raising and lowering said housing and its associated parts for placing said speedometer and odometer in the line of sight of the driver through said windshield.

3. A vehicle having a speedometer combination adapted to be viewed by the driver at all times without distracting his attention from the road, comprising an instrument panel having a space therebehind and an opening therethrough adjacent its top, a windshield adjacent and higher than said panel; a speedometer cable extending into the space behind said panel; a speedometer housing behind said panel into which said cable extends and having an indicating portion thereof only extending up through said panel opening; and a rigid rod slidably mounted for movement in a vertical plane with respect to said panel and detachably connected to said housing so as to guide said housing in its vertical movement when attached to said rod and locate it relative to said panel whereby when said rod is raised or lowered manually said housing is raised or lowered simultaneously relative to said panel and said windshield depending on the direction of motion of said rod.

4. The combination with the vehicle of claim 3 of means for counter-balancing the weight of said speedometer housing on said rod.

5. The combination of claim 4 wherein said counterbalance furnishes a force equal to more than half the weight of said housing and its contents.

6. The combination of claim 4 wherein said means for counter-balancing comprises a coil spring around said rod compressed between said housing and a lower element of said panel.

7. The combination with the vehicle of claim 3 of an odometer supported by said housing adjacent said indicating portion for movement with said indicating portion, said odometer having rotating digits located above said panel when said indicating portion is in the raised position relative to said panel, said odometer being substantially above said housing, said odometer being driven by said cable.

8. The combination of claim 7 wherein said odometer is a vertical column with each series of its digits lying directly over each other, so that the mileage indicated is read vertically, said column being located near the center of said indicating portion and between said portion and said windshield.

9. The combination of claim 3 in which the major portion of said indicating portion is transparent.

10. A vehicle with a speedometer that the driver can see at all times without taking his attention away from the roadway, including in combination an instrument panel at least partially enclosing a space and having an opening therethrough adjacent its top; a windshield forward of and extending higher than said panel; a speedometer cable extending into said space; a speedometer housing in said space connected to said cable and having a substantially transparent indicating portion thereof only that extends up through said panel opening into the field of vision of said driver and a portion containing the operating mechanism for said speedometer and located in said space at all times; support means for said speedometer housing having a rigid connection relative to said housing with a portion movable relative to said panel for projecting said housing up and down through said opening to obtain the position best suited to said driver and for holding any position desired, said movement being controlled by a handle readily accessible to said operator, said handle extending through said panel.

11. A vehicle with a velocity meter which the driver may see at all times without taking his attention away from the roadway, including in combination an instrument panel at least partially enclosing a space and having an opening therethrough adjacent its top, a windshield forward of and extending up higher than said panel, a meter operating cable extending into said space, a meter housing in said space connected to said cable and having a substantially transparent indicating portion thereof that extends up through said panel opening into the field of vision of said driver and a portion containing the operating mechanism for said meter and located in said space at all times, support means for said meter housing having a rigid connection therewith and being movable relative to said panel for projecting said housing up and down through said opening to obtain the position best suited to said driver and for holding any position desired, said movement being controlled by means extending through said panel and readily accessible from driving position in said vehicle.

References Cited in the file of this patent
UNITED STATES PATENTS

| | | |
|---|---|---|
| 2,357,199 | Holst | Aug. 29, 1944 |
| 2,449,155 | Walker | Sept. 14, 1948 |
| 2,804,931 | Najjar | Sept. 3, 1957 |

FOREIGN PATENTS

| | | |
|---|---|---|
| 17,891 | Switzerland | Oct. 13, 1898 |